(12) United States Patent
Shaffer et al.

(10) Patent No.: US 9,833,123 B2
(45) Date of Patent: Dec. 5, 2017

(54) DISHWASHER APPLIANCE AND A METHOD FOR MOUNTING A SLIDE RAIL IN A DISHWASHER APPLIANCE

(71) Applicant: General Electric Company, Schenectady, NY (US)

(72) Inventors: Ryan Joseph Shaffer, Louisville, KY (US); Eugenio Gomez, Louisville, KY (US); A. Vinodh Magimai Raj, Hyderabad (IN); Benjamin Carl Maddux, Louisville, KY (US); Brian David Sanzone, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 844 days.

(21) Appl. No.: 14/149,877

(22) Filed: Jan. 8, 2014

(65) Prior Publication Data
US 2015/0190033 A1    Jul. 9, 2015

(51) Int. Cl.
*A47L 15/50*    (2006.01)
*A47L 15/42*    (2006.01)
*F16B 5/02*     (2006.01)

(52) U.S. Cl.
CPC ......... *A47L 15/507* (2013.01); *A47L 15/4246* (2013.01); *F16B 5/02* (2013.01); *Y10T 29/49826* (2015.01); *Y10T 29/49947* (2015.01); *Y10T 29/49963* (2015.01)

(58) Field of Classification Search
CPC .. A47L 15/507; A47L 15/427; A47L 15/4272; A47L 15/4246; A47B 2210/0059; A47B 2210/17; A47B 88/044; A47B 2088/0437
See application file for complete search history.

(56) References Cited

U.S. PATENT DOCUMENTS

| 3,044,842 | A | * | 7/1962 | Mercer | A47L 15/507 312/228.1 |
|---|---|---|---|---|---|
| 7,168,578 | B2 | * | 1/2007 | Mersch | A47L 15/504 134/56 D |
| 9,579,010 | B2 | * | 2/2017 | Shewmaker | A47L 15/507 |
| 2006/0250058 | A1 | * | 11/2006 | Stevens | A47L 15/502 312/311 |
| 2007/0144562 | A1 | * | 6/2007 | Classen | A47L 15/4257 134/57 DL |
| 2008/0067905 | A1 | | 3/2008 | Guiles | |
| 2011/0193457 | A1 | | 8/2011 | Bastuji | |
| 2011/0266935 | A1 | | 11/2011 | Baldwin et al. | |
| 2012/0176010 | A1 | * | 7/2012 | Buhlmeyer | A47L 15/507 312/228 |
| 2013/0057132 | A1 | * | 3/2013 | Flowers | A47L 15/507 312/228.1 |

FOREIGN PATENT DOCUMENTS

EP     1800590     6/2007

* cited by examiner

*Primary Examiner* — Joseph L Perrin
*Assistant Examiner* — Irina Graf
(74) *Attorney, Agent, or Firm* — Dority & Manning, P.A.

(57) ABSTRACT

A dishwasher appliance and a method for mounting a slide rail within a dishwasher appliance are provided. A rack assembly of the dishwasher appliance includes a bracket with a post. A slide rail is mounted to the bracket, and the slide rail and the bracket are positioned within a wash chamber of the dishwasher appliance. The post extends through the tub, and a sleeve is positioned opposite the bracket on the tub and engages the post. The sleeve hinders retraction of the post through the tub.

18 Claims, 11 Drawing Sheets

DISHWASHER APPLIANCE AND A METHOD FOR MOUNTING A SLIDE RAIL IN A DISHWASHER APPLIANCE

FIELD OF THE INVENTION

The present subject matter relates generally to dishwasher appliances and methods for mounting slide rails in the same.

BACKGROUND OF THE INVENTION

A dishwasher appliance is typically provided with one or more rack assemblies into which various articles may be loaded for cleaning. The rack assemblies may include features such as, e.g., tines that hold and orient the articles to receive sprays of wash and rinse fluids during the cleaning process. The articles to be cleaned may include a variety of dishes, cooking utensils, silverware, and other items.

Certain dishwasher appliances include rack assemblies that are mounted to tubs of the dishwasher appliances with wheel and rack systems. The wheel can roll within a slide track in order to permit movement of the rack assembly into and out of the tub. Wheel and rack systems have certain drawbacks. For example, inconsistent rotation of the wheel within the rack can provide inconsistent rack assembly motion. As another example, wheel and rack systems can require relatively high insertion and/or retraction forces to move the rack assembly. In addition, the rack is generally mounted to the tub with welding or adhesive such that removing the rack from the tub is difficult.

Slides rails can provide smooth rack assembly motion. However, slide rails can be difficult to mount to the tub. In particular, top portions of the tub can include curved surfaces. Mounting a slide rail at the top portion of the tub can be difficult due to such curved surfaces.

Accordingly, a dishwasher appliance with features for assisting with smooth rack assembly motion would be useful. In particular, a dishwasher appliance with features for providing smooth rack assembly motion for a rack assembly at a top portion of the tub would be useful. In addition, a dishwasher appliance with features for assisting an installer with mounting a rack assembly within the dishwasher appliance would be useful.

BRIEF DESCRIPTION OF THE INVENTION

The present subject matter provides a dishwasher appliance and a method for mounting a slide rail within a dishwasher appliance. A rack assembly of the dishwasher appliance includes a bracket with a post. A slide rail is mounted to the bracket, and the slide rail and the bracket are positioned within a wash chamber of the dishwasher appliance. The post extends through the tub, and a sleeve is positioned opposite the bracket on the tub and engages the post. The sleeve hinders retraction of the post through the tub. Additional aspects and advantages of the invention will be set forth in part in the following description, or may be apparent from the description, or may be learned through practice of the invention.

In a first exemplary embodiment, a dishwasher appliance is provided. The dishwasher appliance includes a tub that defines a wash chamber. A rack assembly is positioned within the wash chamber. The rack assembly includes a bracket positioned within the wash chamber. A post is mounted to the bracket. The post extends through the tub. A sleeve is positioned opposite the bracket on the tub. The sleeve engages the post such that the sleeve hinders the post from retracting through the tub. A slide rail is positioned within the wash chamber and is mounted to the bracket.

In a second exemplary embodiment, a method for mounting a slide rail to a tub of a dishwasher appliance is provided. The method includes providing a tub that defines a wash chamber, a bracket with a post and a sleeve. The method also includes positioning the bracket within the wash chamber of the tub, directing the post of the bracket through a hole defined by the tub and fastening the sleeve onto the post of the bracket.

In a third exemplary embodiment, a dishwasher appliance is provided. The dishwasher appliance includes a tub that defines a wash chamber. A wire frame is positioned within the wash chamber. A slide rail is mounted to the tub. The dishwasher appliance also includes means for coupling the wire frame to the slide rail.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
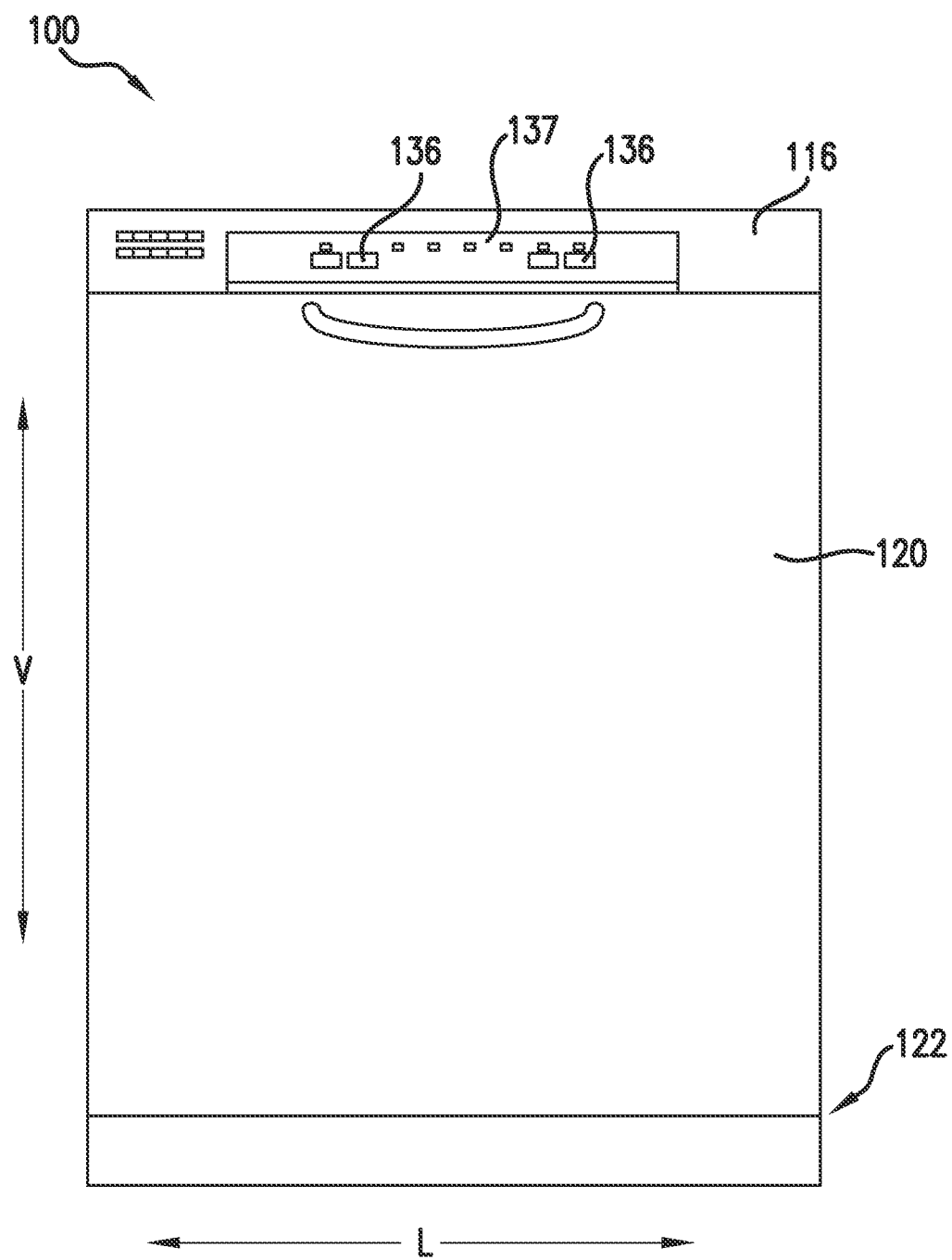
FIG. 1 provides a front, elevation view of a dishwasher appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
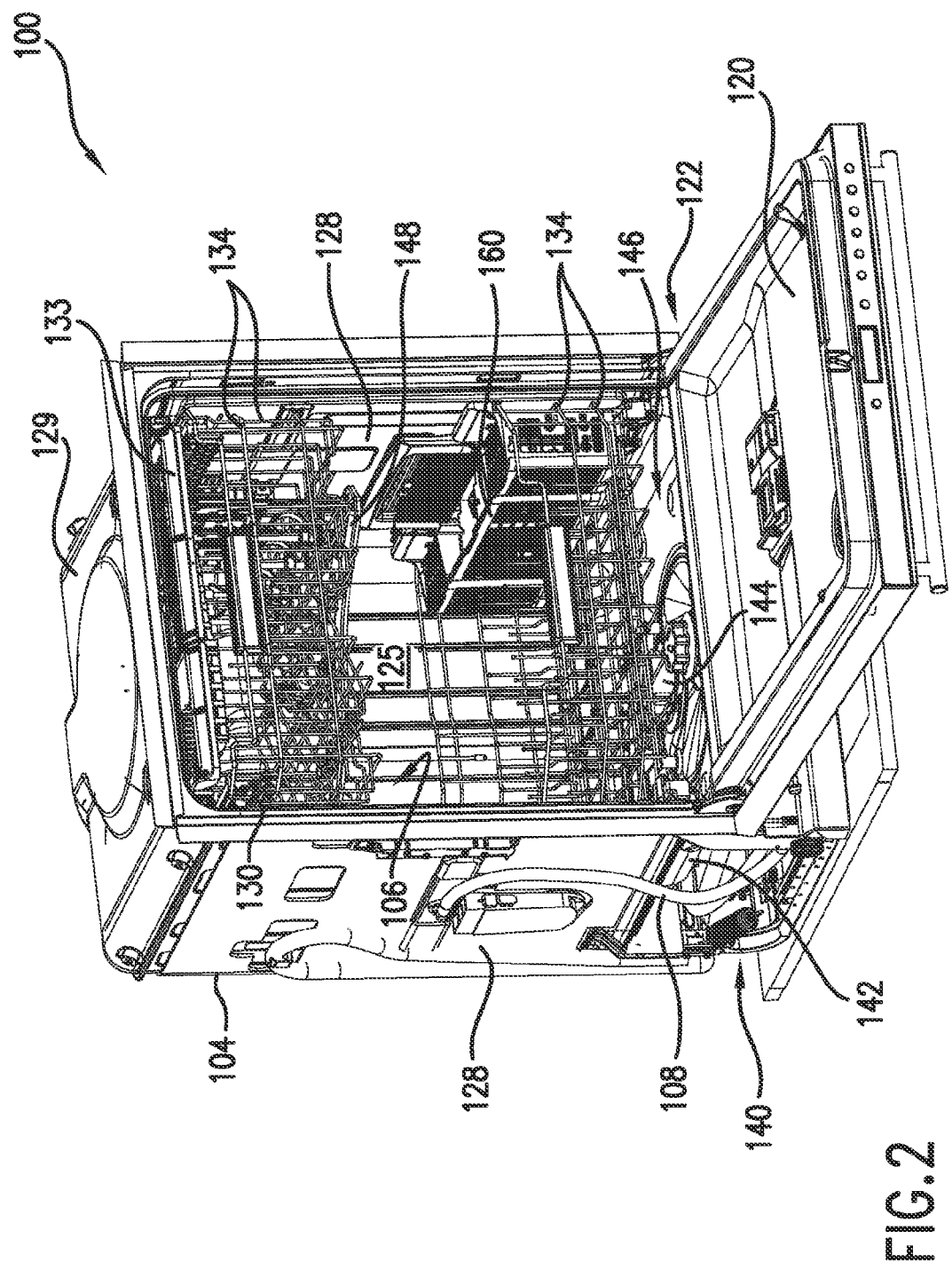
FIG. 2 provides a perspective view of the exemplary dishwasher appliance of FIG. 1 with a door of the exemplary dishwasher appliance shown in an open position to reveal a wash chamber of the exemplary dishwasher appliance.

FIG. 1 provides a front, elevation view of a dishwasher appliance 100 according to an exemplary embodiment of the present subject matter. FIG. 2 provides a perspective view of dishwasher appliance 100 with a door 120 of dishwasher appliance 100 shown in an open position to reveal a wash chamber or compartment 106 of dishwasher appliance 100. Dishwasher appliance 100 defines a vertical direction V, a lateral direction L, and a transverse direction T. Vertical direction V, lateral direction L, and transverse direction T are mutually perpendicular and form an orthogonal directional system.

Dishwasher appliance 100 includes a tub 104 that defines wash compartment 106. Tub 104 has a pair of side walls 128, a back wall 125, and a top wall 129 that assist with defining wash compartment 106. Side walls 128 are spaced apart from each other, e.g., along the lateral direction L. Back wall 125 and top wall 129 extend between and connect side walls 128, e.g., along the lateral direction L. Tub 104 also includes door 120 hinged at its bottom 122 for movement between a normally closed configuration (shown in FIG. 1) in which wash compartment 106 is sealed shut, e.g., for washing operation, and an open configuration (shown in FIGS. 2 and 3) for loading and unloading of articles from dishwasher appliance 100.

Turning to FIG. 2, tub side walls 128 accommodate middle and lower rack assemblies 130 and 132. Each of the middle and lower racks assemblies 130 and 132 is fabricated from lattice structures that include a plurality of wires or elongated members 134. Dishwasher appliance 100 also includes an upper rack assembly 133 positioned above middle and lower racks assemblies 130 and 132, e.g., along the vertical direction V, at a top portion of wash compartment 106. Each rack assembly 130, 132 and 133 is adapted for movement between an extended loading position (not shown) in which the rack assembly is substantially positioned outside the wash compartment 106, and a retracted position (shown in FIGS. 1 and 2) in which the rack assembly is located inside the wash compartment 106.

Dishwasher appliance 100 includes a lower spray assembly 144 that is mounted within a lower region 146 of the wash compartment 106 and above a tub sump portion 142 so as to be in relatively close proximity to the lower rack assembly 132. A mid-level spray assembly 148 is located in an upper region of the wash compartment 106 and may be located in close proximity to middle rack assembly 130. Additionally, an upper spray assembly (not shown) may be located above the upper rack assembly 133 and mounted to top wall 129 of tub 104.

The lower and mid-level spray assemblies 144 and 148 and the upper spray assembly are fed by a pump (not shown) for circulating water and wash fluid (e.g., detergent, water, and/or rinse aid) in the tub 104. The pump is located in a machinery compartment 140 located below the bottom sump portion 142 of the tub 104, as generally recognized in the art. A conduit or circulation piping 108 directs water and/or wash fluid from the pump to lower spray assembly 144 and mid-level spray assembly 148.

Each spray assembly includes an arrangement of discharge ports or orifices for directing wash fluid onto dishes or other articles located in the middle and lower rack assemblies 130, 132, silverware basket 160 and upper rack assembly 133. Lower spray assembly 144 is rotatably mounted in wash compartment 106. Accordingly, the arrangement of the discharge ports on lower spray assembly 144 may provide a rotational force by virtue of washing fluid flowing through the discharge ports. The resultant rotation of the lower spray assembly 144 can provide coverage of dishes and other dishwasher contents with a washing spray.

The dishwasher appliance 100 is further equipped with a controller 137 to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated exemplary embodiment, controller 137 is located within a control panel 116 of door 120. In alternative exemplary embodiments, controller 116 may be positioned beneath tub 104 or at any other suitable location on dishwasher appliance 100. Typically, controller 137 includes a user interface panel 136 through which a user may select various operational features and modes and monitor progress of the dishwasher appliance 100. In one exemplary embodiment, user interface 136 represents a general purpose I/O ("GPIO") device or functional block. In another exemplary embodiment, user interface 136 includes input components, such as one or more of a variety of electrical, mechanical or electro-mechanical input devices including rotary dials, push buttons, and touch pads. User interface 136 may include a display component, such as a digital or analog display device designed to provide operational feedback to a user.

It should be appreciated that the present subject matter is not limited to any particular style, model, or other configuration of dishwasher appliance and that dishwasher appliance 100 depicted in FIGS. 1 and 2 is provided for illustrative purposes only. For example, the present subject matter may be used in dishwasher appliances having other rack configurations or spray assembly arrangements.

Figure 3:
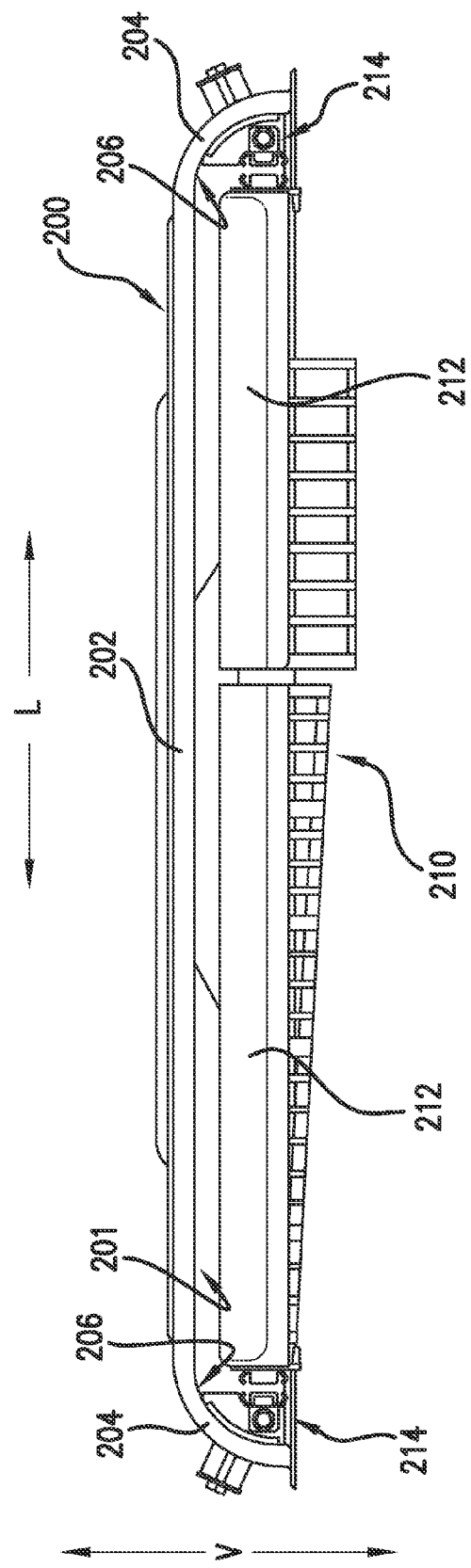
FIG. 3 provides a partial front elevation view of a tub and a rack assembly for a dishwasher appliance according to an exemplary embodiment of the present subject matter.
Figure 4:
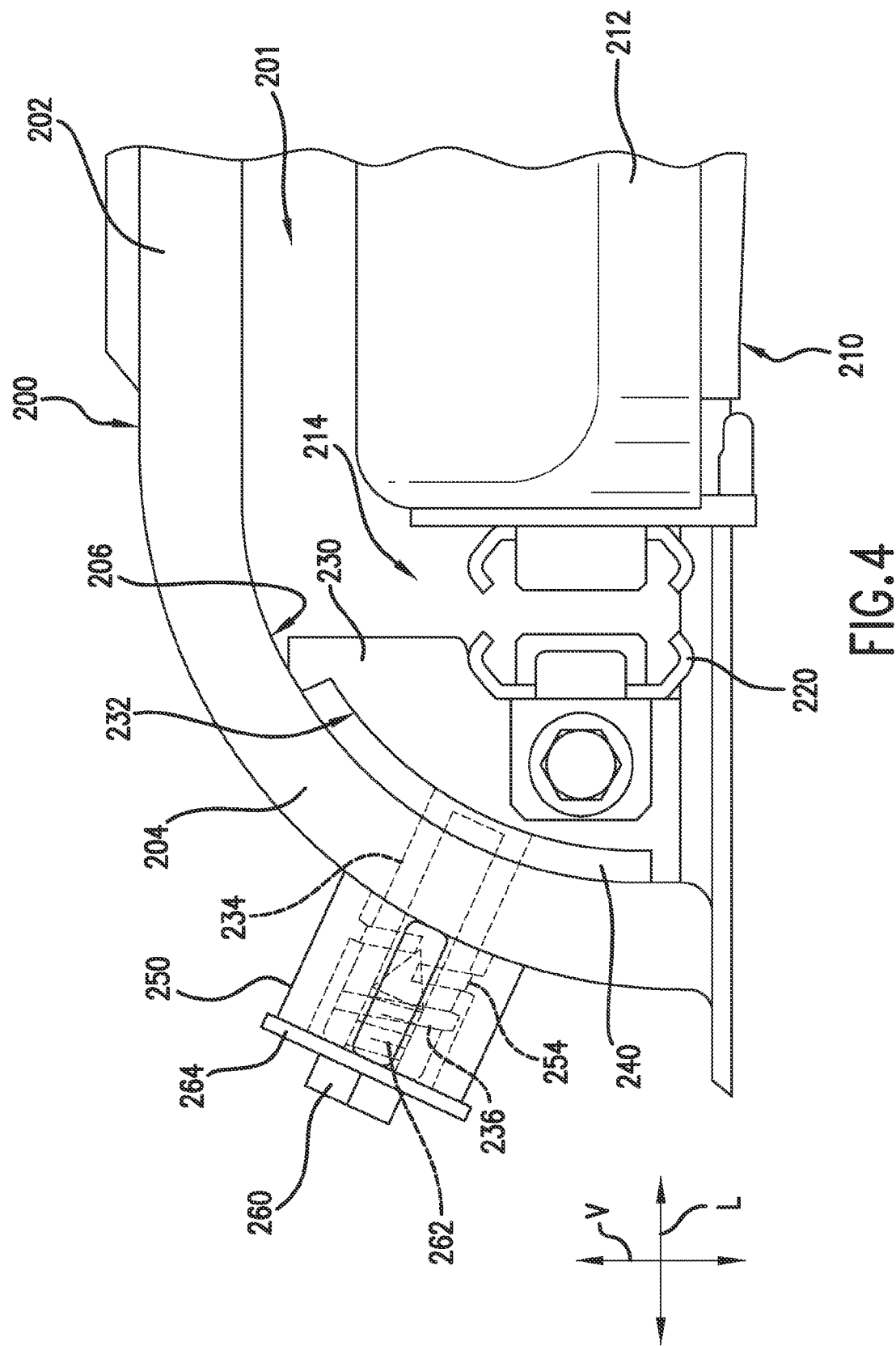
FIG. 4 provides a front elevation view of a portion of the exemplary tub and the exemplary rack assembly of FIG. 3.

FIG. 3 provides a partial front elevation view of a tub 200 and a rack assembly 210 for a dishwasher appliance according to an exemplary embodiment of the present subject matter. FIG. 4 provides a front elevation view of a portion of tub 200 and rack assembly 210. Tub 200 and rack assembly 210 can be used in any suitable dishwasher appliance. For example, tub 200 and/or rack assembly 210 may be used in dishwasher appliance 100 (FIG. 1). In particular, rack assembly 210 may be positioned in wash compartment 106 at a top portion of tub 104 as upper rack assembly 133 and be configured for receipt of silverware and other relatively small articles for washing.

As may be seen in FIGS. 3 and 4, tub 200 defines a wash chamber 201 and includes a top wall 202 and transition portions 204. In dishwasher appliance 100 (FIG. 2), top wall 202 of tub 200 may be used as top wall 129 of tub 104. Transition portions 204 correspond to portions of tub 200 that extend between top wall 202 and other portions of tub 200, e.g., along the vertical direction V. For example, in dishwasher appliance 100 (FIG. 2), transition portions 204 of tub 200 can extend between top wall 202 and side walls 128 and/or back wall 125, e.g., along the vertical direction V. Transition portions 204 include curved inner surfaces 206. In certain exemplary embodiments, tub 200 is constructed of or with a molded material, such as plastic, or a stamped material, such as stainless steel.

Rack assembly 210 includes silverware baskets 212 and mounting assemblies 214. Silverware baskets 212 are configured for receiving and supporting silverware therein during operation of an associated dishwasher appliance. Mounting assemblies 214 mount silverware baskets 212 to tub 200. Thus, mounting assemblies 214 can assist with supporting silverware baskets 212 within wash chamber 201 of tub 200. It should be understood that mounting assemblies 214 can be used to mount any suitable rack assembly to tub 200. As an example, mounting assemblies 214 may be used to mount a relatively large rack assembly, such as middle rack assembly 130 (FIG. 2) at top portion of tub 104.

Turning now to FIG. 4, mounting assembly 214 includes a slide rail 220 and a bracket 230. Bracket 230 is mounted to tub 200 and is positioned within wash chamber 201 of tub 200. As discussed above, tub 200 defines curved inner surface 206. Bracket 230 may be positioned in wash chamber 201 at or on curved inner surface 206 of tub 200. In particular, bracket 230 defines a curved outer surface 232. Curved outer surface 232 of bracket 230 is complementary to curved inner surface 206 of tub 200. In particular, a shape or profile of curved outer surface 232 of bracket 230 can substantially match or fit curved inner surface 206 of tub 200, e.g., in a plane that is perpendicular to the transverse direction T. Curved outer surface 232 of bracket 230 may be positioned on or at curved inner surface 206 of tub 200.

Bracket 230 includes various features for assisting with mounting bracket 230 to tub 200, e.g., easily and/or quickly. In particular, a threaded projection or post 234 is mounted to bracket 230. In particular, threaded post 234 is integrally mounted to bracket 230 such that threaded post 234 and bracket 230 are constructed from a single continuities piece of material, such as molded plastic. Threaded post 234 extends from bracket 230 through the tub 200. A sleeve 250 is threaded onto threaded post 234, e.g., outside of wash chamber 201 of tub 200. Thus, sleeve 250 is not disposed within wash chamber 201 of tub 200. A fastener 260 also extends into threaded post 234, e.g., outside of wash chamber 201 of tub 200. Thus, fastener 260 is also not disposed within wash chamber 201 of tub 200. Slide rail 220 is positioned within wash chamber 201 of tub 200. In particular, slide rail 220 is fixed or mounted to bracket 230 within wash chamber 201 of tub 200.

Figure 5:
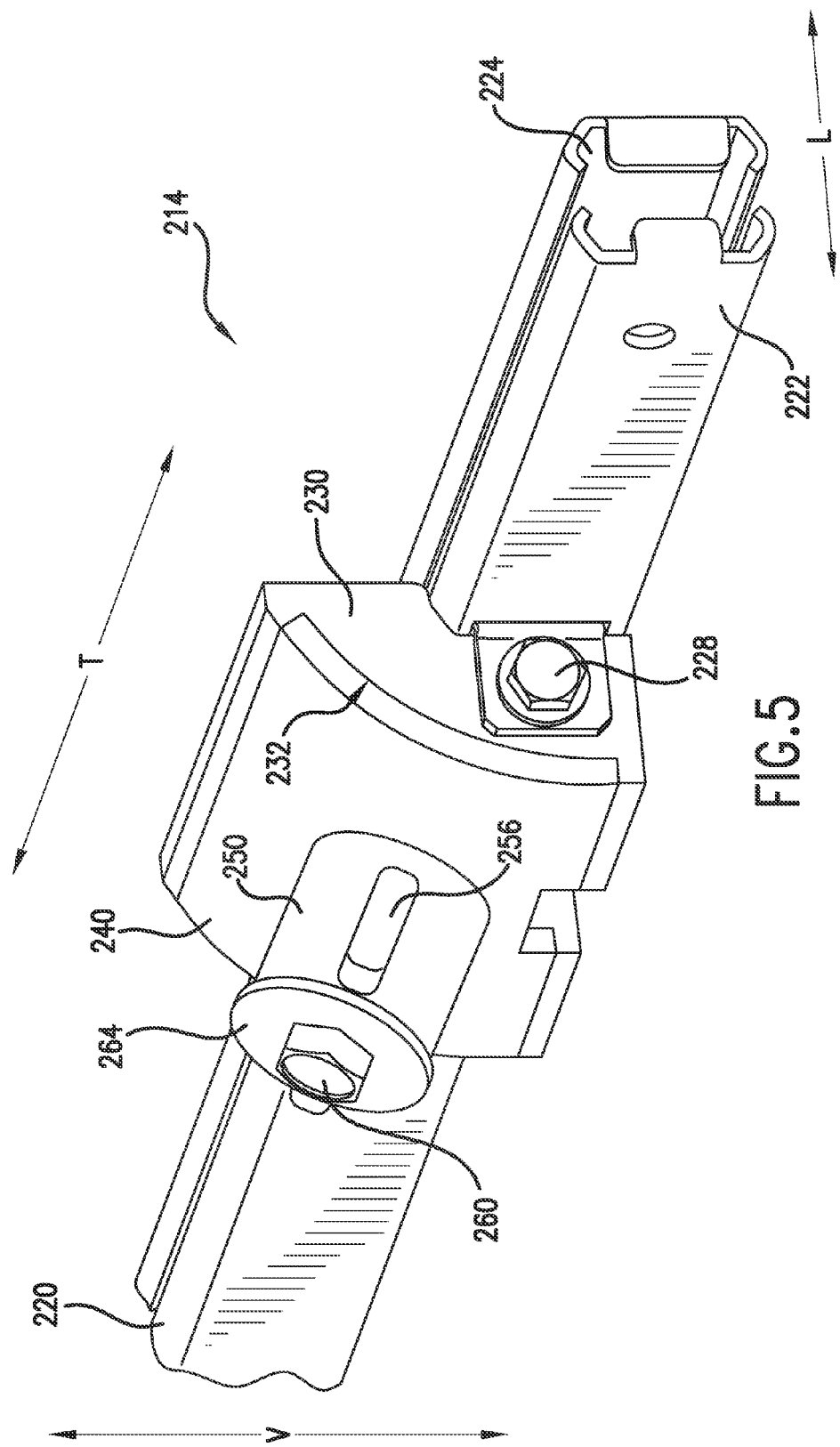
FIG. 5 provides a partial perspective view of certain components of the exemplary rack assembly of FIG. 3.
Figure 6:
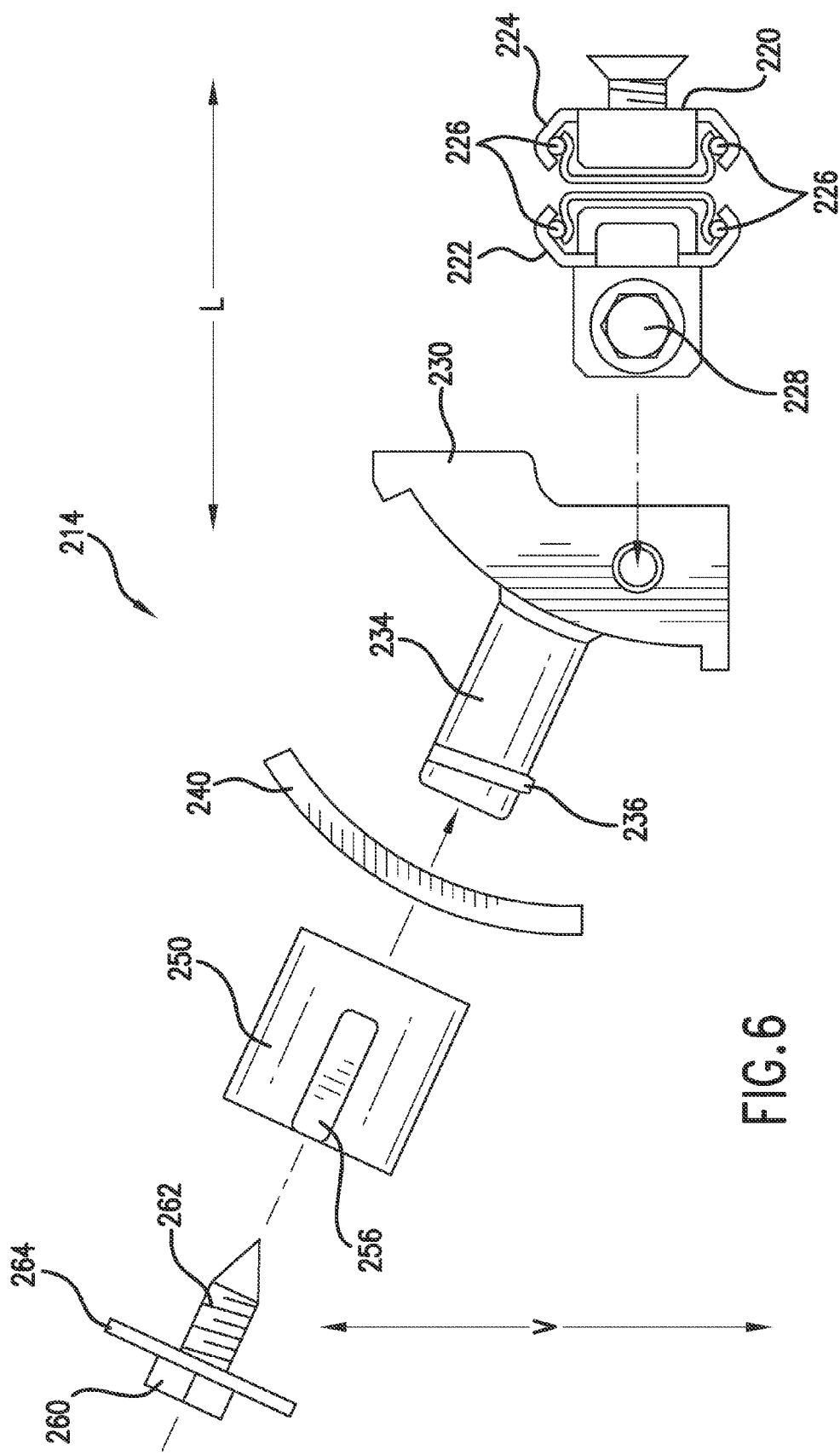
FIG. 6 provides an exploded view of certain components of the exemplary rack assembly of FIG. 3.

FIG. 5 provides a partial perspective view of certain components of the rack assembly 210. FIG. 6 provides an exploded view of certain components of rack assembly 210. As may be seen in FIGS. 5 and 6, slide rail 220 includes a first rail 222 and a second rail 224. First and second rails 222 and 224 are mounted to each other such that first and second rails 222 and 224 are slidable relative to each other. In partial, bearings 226 disposed between first and second rails 222 and 224 can permit movement or sliding of second rail 224 relative to first rail 222. First rail 222 is mounted to bracket 230. In the exemplary embodiment shown in FIG. 5, a screw 228 extends through first rail 222 into bracket 230 in order to mount first rail 222 to bracket 230. In alternative exemplary embodiments, first rail 222 can be mounted to bracket 230 using any suitable method or mechanism. As will be understood by those skilled in the art, slide rail 220 can also include a third rail (not shown). The third rail can permit slide rail 220 to position silverware baskets 212 completely outside wash chamber 201 of tub 200, e.g., when slide rail 220 is extended.

Rack assembly 210 also includes a seal or gasket 240. Gasket 240 is positioned at or on curved outer surface 232 of bracket 230. Gasket 240 assist with hindering or preventing leaks or liquid flow out of wash chamber 201 of tub 200. Gasket 240 is discussed in greater detail below.

As discussed above, sleeve 250 is threaded or mounted onto threaded post 234. In particular, a screw thread 236 of threaded post 234 engages or meshes with a screw thread 254 (FIG. 4) of sleeve 250. Similarly, fastener 260 is also threaded or mounted onto threaded post 234. In particular, a screw thread 262 of fastener 260 engages or meshes with threaded post 234. Turning back to FIG. 4, screw thread 236 of threaded post 234 is coarser than screw thread 262 of fastener 260. In particular, a pitch of screw thread 262 of fastener 260 may be at least two times greater than a pitch of screw thread 236 of threaded post 234.

Figure 7:
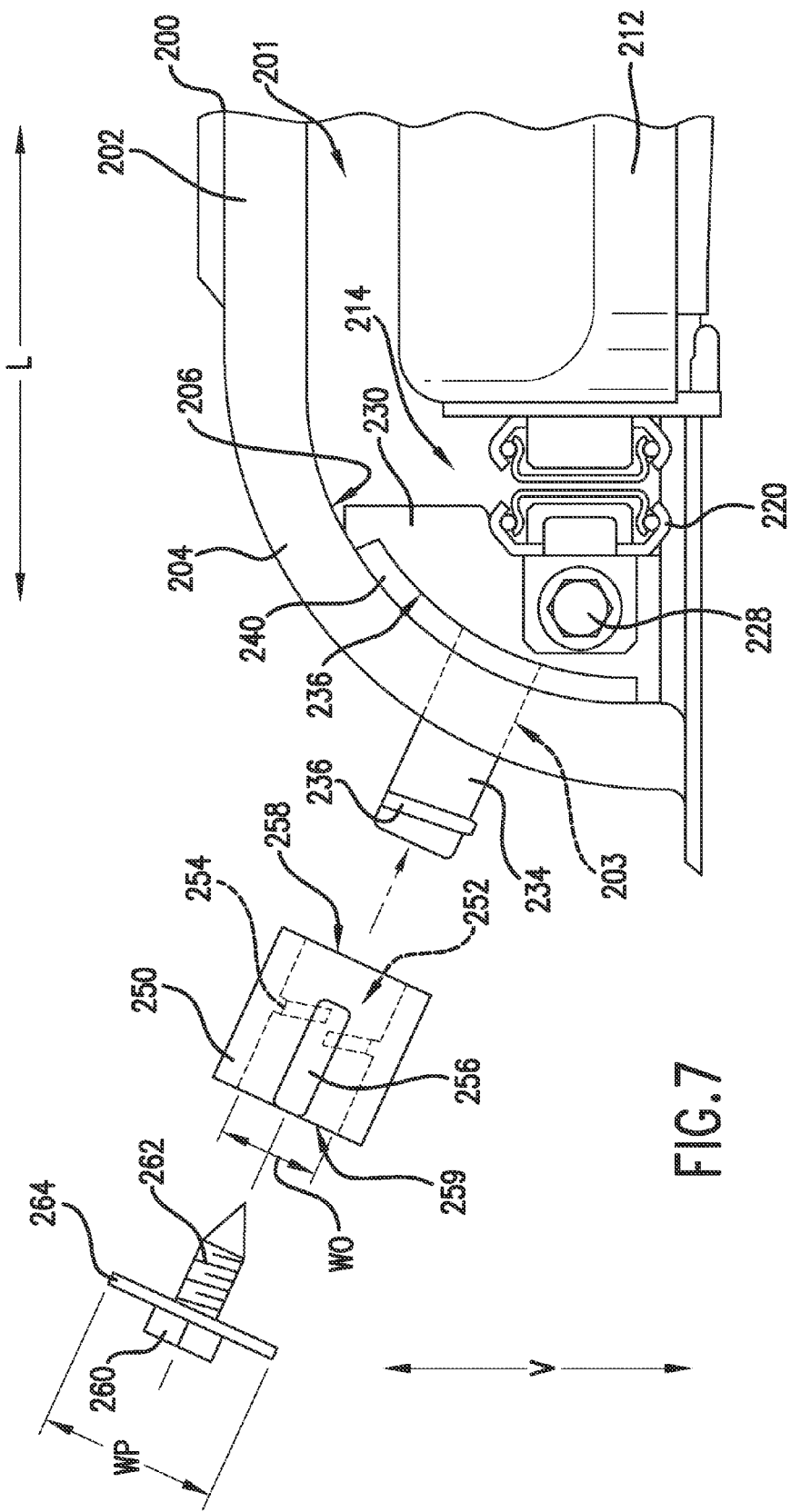
FIGS. 7 and 8 provide partial, section views of the exemplary rack assembly and the exemplary tub of FIG. 3 in various stages of assembly.
Figure 8:
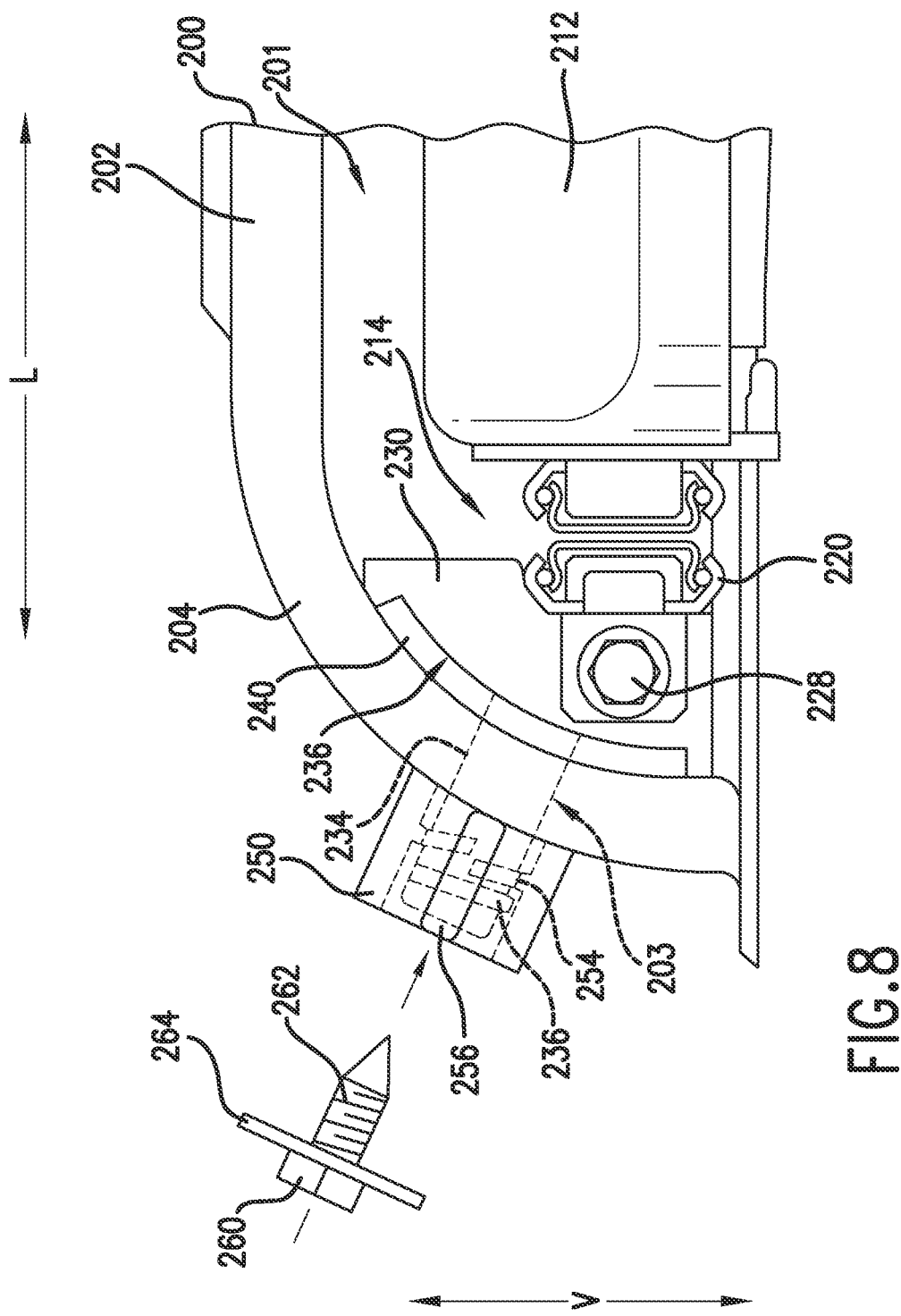

FIGS. 7 and 8 provide various views of rack assembly 210 being mounted to tub 200. As may be seen in FIGS. 7 and 8, sleeve 250 defines an inner chamber 252. Screw thread 254 of sleeve 250 is positioned at or adjacent inner chamber 252 of sleeve 250. Inner chamber 252 of sleeve 250 extends between a first opening 258 and a second opening 259. First opening 258 is sized for receiving threaded post 234. In particular, threaded post 234 can extend from wash chamber 201 through tub 200 into inner chamber 252 of sleeve 250 at first opening 258 of inner chamber 252.

Fastener 260 extends into inner chamber 252 of sleeve 250 at second opening 259 of inner chamber 252. In particular, fastener 260 includes a head or plate 264, such as a washer. Plate 264 has a width WP. Second opening 259 of inner chamber 252 also has a width WO. The width WP of plate 264 and the width of the second opening 259 can be any suitable widths. For example, the width WP of plate 264 may be greater than the width WO of second opening 259 of inner chamber 252. Plate 264 of fastener 260 can compress against sleeve 250 at second opening 259 of inner chamber 252 in order assist with mounting rack assembly 210 to tub 200.

Mounting of rack assembly 210 to tub 200 is discussed in greater detail below with reference to FIGS. 7 and 8. To mount rack assembly 210 to tub 200, an assembler can mount slide rail 220 to bracket 230, e.g., with screw 228. The assembler can position bracket 230 (with slide rail 220 mounted thereto) within wash chamber 201 of tub 200. In addition, the assembler can directed or insert threaded post 234 through a hole 203 defined by tub 200, e.g., until curved outer surface 232 of bracket 230 is disposed on or at curved inner surface 206 of tub 200 and screw thread 236 of threaded post 234 is positioned or disposed outside of wash chamber 201 of tub 200, as shown in FIG. 7. With threaded post 234 so positioned, the assembler can hold or support bracket 230 and slide rail 220 within wash chamber 201 of tub 200 and rotate sleeve 250 onto threaded post 234. In particular, the assembler can rotate sleeve 250 manually or by hand, e.g., utilizing wings 256 of sleeve 250, onto threaded post 234. The assembler can tighten sleeve 250 onto threaded post 234 until thread screw 236 of threaded post 234 rotates through or past screw thread 254 of sleeve 250. With sleeve 250 so positioned, sleeve 250 supports bracket 230 and slide rail 220 within wash chamber 201 of tub 200 by preventing or hindering threaded post 234 from moving back through hole 203 into wash chamber 201 of tub 200. Thus, the assembler can let go of and stop supporting bracket 230 and slide rail 220 within wash chamber 201 of tub 200 due to sleeve 250 supporting such components.

With sleeve 250 supporting bracket 230 and slide rail 220 within wash chamber 201 of tub 200, the assembler fixes fastener 260 to threaded post 234. In particular, the assembler can rotate or turn fastener 260 with a tool or drill in order to thread fastener 260 into threaded post 234 with the drill. Thus, the assembler can utilize the drill to mesh or engage screw thread 262 of fastener 260 to threaded post 234. The assembler can tighten fastener 260 against sleeve 250 and/or fix fastener 260 to threaded post 234 such that bracket 230 is drawn towards tub 200 within wash chamber 201 of tub 200. By drawing bracket 230 towards tub 200, gasket 240 is compressed between tub 200 and bracket 230, e.g., between curved outer surface 232 of bracket 230 and curved inner surface 206 of tub 200. By extending between tub 200 and bracket 230, gasket 240 can assist with limiting or preventing leaks or liquid flow through or out of hole 203.

Mounting assembly 214 can assist with mounting slide rail 220 to tub 200 within wash chamber 201 of tub 200, e.g., without welding and/or tox. Mounting assembly 214 can also permit a single installer or assembler to mount slide rail 220 to tub 200 within wash chamber 201 of tub 200. Slide rail 220 can be substantially level when mounted to tub 200.

It should be understood that in alternative exemplary embodiments, post 234 need not be threaded. Thus, in alternative exemplary embodiments, sleeve 250 can be coupled or engage post 234 in any suitable manner to hinder or prevent post 234 from retracting or moving back through hole 203 into wash chamber 201 of tub 200. For example, sleeve 250 may be snap fit over post 234, double sided tape or adhesive may extend between and couple post 234 and sleeve 250 together, an interference fit or magnets may couple sleeve 250 to post 234, etc.

Figure 9:
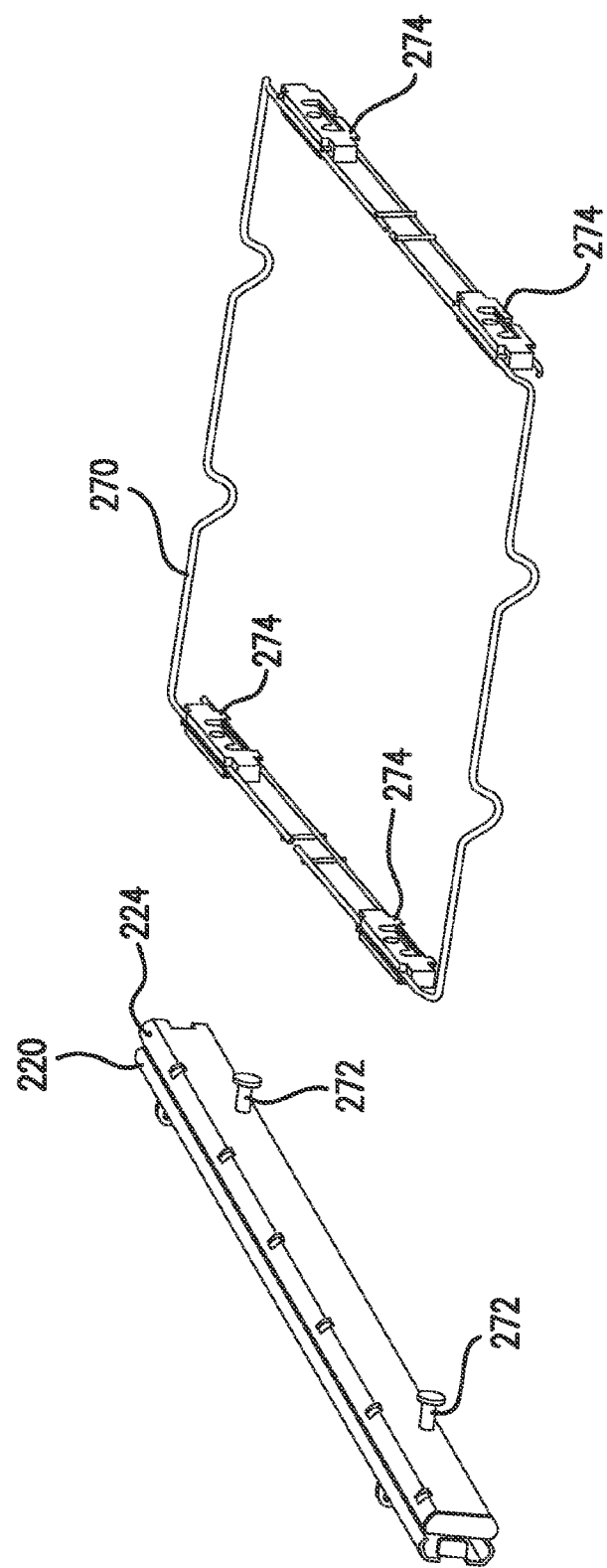
FIG. 9 provides a perspective view of a wire rack and a slide rail of the exemplary rack assembly of FIG. 3.

FIG. 9 provides a perspective view of a wire rack or frame 270 and slide rail 220. Wire frame 270 is configured for supporting silverware baskets 212 (FIG. 3) thereon. As may be seen in FIG. 9, a plurality of projections 272 are mounted to slide rail 220, e.g., second rail 224 of slide rail 220, and a plurality of clips 274 are mounted to wire frame 270. Clips 274 engage respective projections 272 in order to mount or couple wire frame 270 to slide rail 220 as discussed in greater detail below. Clips 274 also permit removal of wire frame 270 from wash chamber 201 of tub 200. Thus, wire frame 270 is selectively mounted to slide rail 220 with clips 274.

Figure 10:
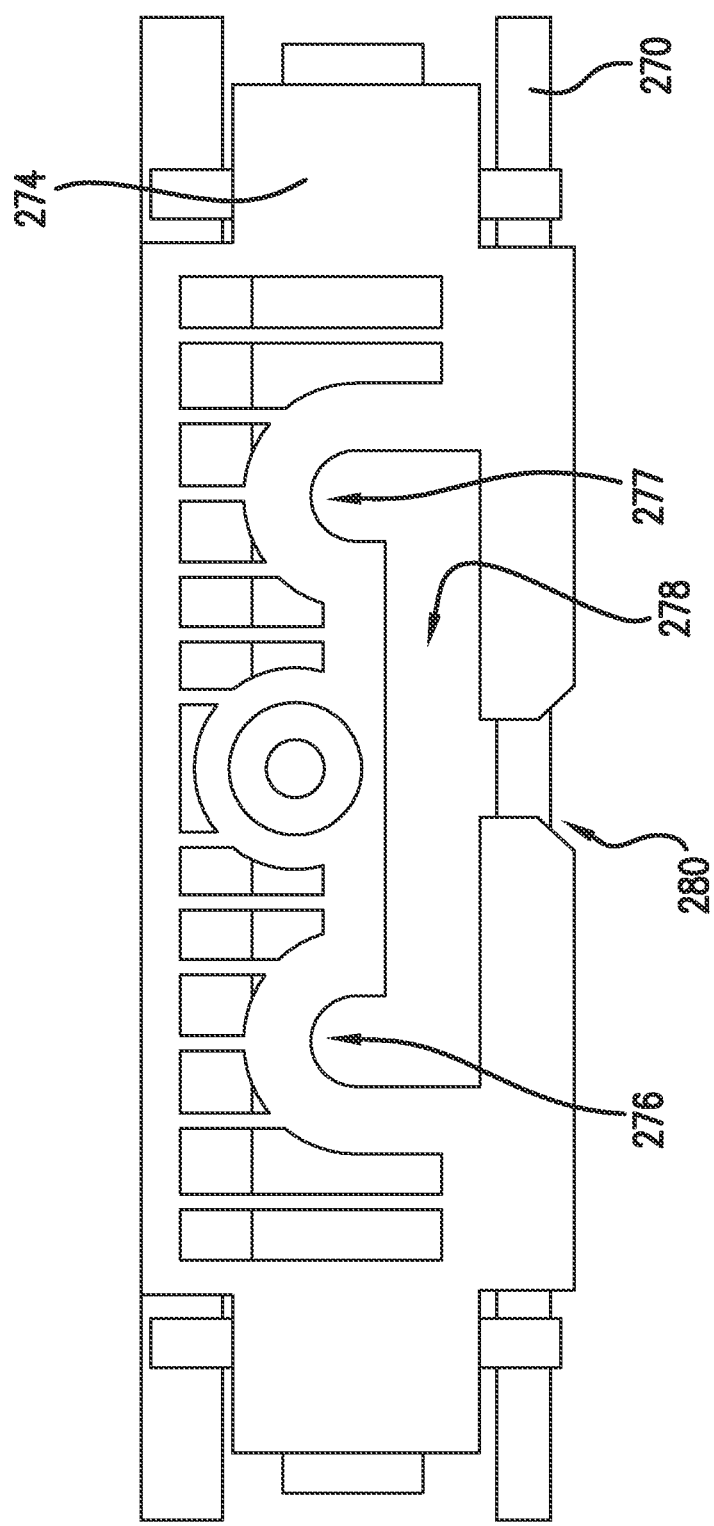
FIG. 10 provides a side, elevation view of a clip of the exemplary rack assembly of FIG. 3.

FIG. 10 provides a side, elevation view of clip 274. As may be seen in FIG. 10, clip 247 defines a first vertical slot 276, a second vertical slot 277, a transverse slot 278 and an entrance 280. First and second vertical slots 276 and 277 are positioned at or adjacent opposite ends of transverse slot 278. Thus, transverse slot 278 extends between first and second vertical slots 276 and 277. Entrance 280 is configured or sized for receiving projection 272 and directing projection 272 into transverse slot 278. Within transverse slot 278, projection 272 is selectively receivable in either first vertical slot 276 or second vertical slot 277 depending upon the desired configuration of wire frame 270. Such selective positioning can assist with permitting wire frame 270 to be mounted to slide rail 220 within wash chamber 201 of tub 200 using a single clip design, e.g., rather than requiring a left side clip and a right side clip. In addition, clip 274 can permit removal of wire frame 270 from slide rail 220, e.g., in order to clean wire frame 270, service slide rail 220 or provide additional space for items within middle rack assembly 130.

Clip 274 can be constructed of or with any suitable material. For example, clip 274 may be constructed of or with metal, such as stainless steel, or molded plastic. Clip 274 can be mounted or attached to wire frame 270 in any suitable manner. For example, clip 274 may be snap fit or clip 277. As another example, clip 274 may be constructed with two components coupled together with wire frame 270 sandwiched or positioned between the two components.

Figure 11:
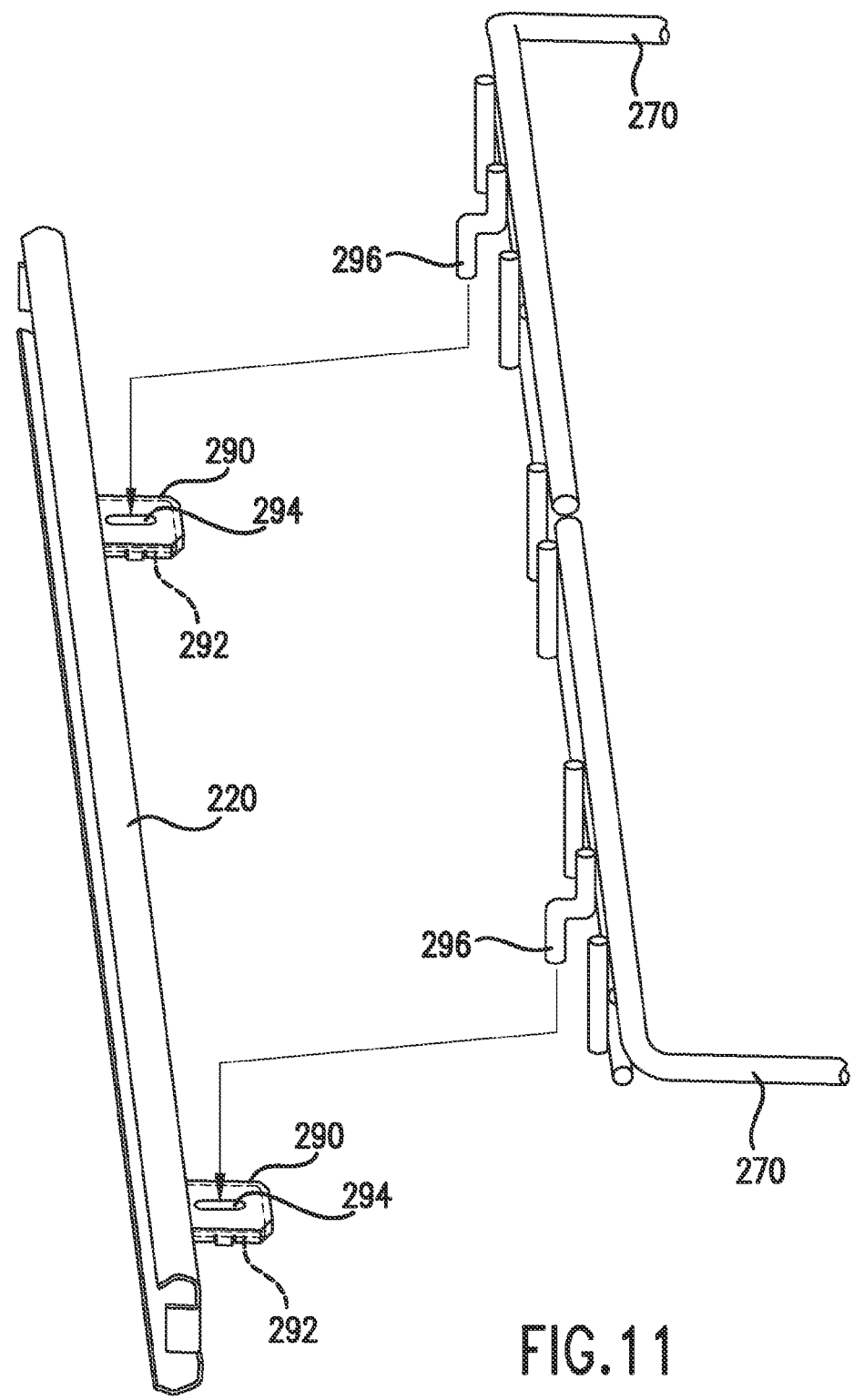
FIG. 11 provides a perspective view of the wire rack and the slide rail of FIG. 9 with a mounting mechanism according to an alternative exemplary embodiment of the present subject matter.

FIG. 11 provides a perspective view of wire rack 270 and slide rail 220. As may be seen in FIG. 11, a plurality of brackets 292 are mounted to slide rail 220, e.g., second rail 224 of slide rail 220, and a plurality of clips 290 are mounted to brackets 292. Clips 290 and brackets 292 define, e.g., vertically oriented, openings 294 for receiving hooks 296. Hooks 296, e.g., that extend downwardly along the vertical direction V, are mounted to wire frame 270 and are selectively positionable within openings 294 in order to mount or couple wire frame 270 to slide rail 220. Hooks 296 also permit removal of wire frame 270 from wash chamber 201 of tub 200. Thus, wire frame 270 is selectively mounted to slide rail 220 with hooks 296.

Clips 290 can also assist with protecting the wire frame 270, e.g., from slide rail 220. For example, clip 290 can serve as a barrier between wire frame 270 and slide rail 220 and prevent or limit damage to a nylon or PVC coating on wire frame 270 from slide rail 220. In alternative exemplary embodiments, any suitable mechanism can be used to limit or prevent slide rail 220 from contacting wire frame 270. For example, a sleeve may be mounted on wire frame 270, a coating may be applied on slide rail 220 and/or a bracket attached to the wire frame 270 that covers the coating on wire frame may be provided.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance, comprising:
   a tub defining a wash chamber; and
   a rack assembly positioned within the wash chamber, the rack assembly comprising
      a bracket positioned within the wash chamber of the tub;
      a post integrally mounted to the bracket as a continuous element, the post extending through the tub;
      a sleeve positioned opposite the bracket on the tub, the sleeve engaging the post such that the sleeve hinders the post from retracting through the tub; and
      a slide rail positioned within the wash chamber and mounted to the bracket,
      wherein the post comprises a threaded post and the sleeve defines an inner chamber that extends between a first opening and a second opening, the threaded post extending through the tub into the inner chamber of the sleeve at the first opening of the inner chamber, a fastener extending into the inner chamber of the sleeve at the second opening of the inner chamber outside of the wash chamber, the fastener being compressed against the sleeve.

2. The dishwasher appliance of claim 1, wherein a top portion of the tub defines a curved inner surface, the bracket defining a curved outer surface that is complementary to the curved inner surface of the tub, the bracket positioned within the wash chamber such that the curved outer surface of the bracket is positioned at the curved inner surface of the tub, wherein the threaded post extends from the curved inner surface.

3. The dishwasher appliance of claim 1, wherein the rack assembly further comprises a gasket extending between the bracket and the tub.

4. The dishwasher appliance of claim 1, wherein the fastener includes a plate having a width, the width of the plate being greater than a width of the second opening of the inner chamber.

5. The dishwasher appliance of claim 1, wherein the slide rail comprises a first rail, a second rail and a plurality of bearings, the first rail mounted to the bracket, the plurality of bearings permitting movement of the second rail relative to the first rail.

6. The dishwasher appliance of claim 5, wherein the rack assembly further comprises a projection, a clip and a wire frame, the projection mounted to the second rail, the clip mounted to the wire frame and defining a vertical slot, the projection received within the vertical slot.

7. The dishwasher appliance of claim 6, wherein the vertical slot is a first vertical slot, the clip further defining a second vertical slot and a transverse slot that extends between the first and second vertical slots, the projection moveable within the transverse slot between the first and second vertical slots.

8. A method for mounting a slide rail to a tub of a dishwasher appliance, comprising:
providing the tub that defines a wash chamber, a bracket with a post and a sleeve, the post integrally mounted to the bracket as a continuous element, the post comprising a threaded post, and the sleeve defining an inner chamber that extends between a first opening and a second opening;
positioning the bracket within the wash chamber of the tub;
directing the post of the bracket through a hole in a wall of the tub such that the post extends through the tub into the inner chamber of the sleeve at the first opening of the inner chamber;
fastening the sleeve to the post of the bracket; and
fixing a fastener to the post, the fastener extending into the inner chamber of the sleeve at the second opening of the inner chamber outside of the wash chamber, the fastener being compressed against the sleeve.

9. The method of claim 8, wherein said step of fastening comprises manually rotating the sleeve onto the post of the bracket.

10. The method of claim 8, wherein said step of fixing comprises turning the fastener with a drill and threading the fastener into the post with the drill.

11. The method of claim 8, further comprising mounting the bracket to the slide rail prior to said step of positioning.

12. The method of claim 11, wherein the slide rail is substantially level after said step of fastening.

13. The method of claim 8, wherein said step of providing farther comprises providing a gasket, wherein said step of positioning comprises positioning the bracket within the wash chamber of the tub such that the gasket is positioned between the tub and the bracket.

14. The method of claim 13, further comprising drawing the bracket towards the tub such that the gasket compresses between the tub and the bracket.

15. The method of claim 8, wherein the bracket is a first bracket and the sleeve is a first sleeve, said step of providing further comprising providing a second bracket with a post and a second sleeve, said step of positioning comprising positioning the first and second bracket within the wash chamber of the tub, said step of directing comprising directing the post of the first bracket through a first hole defined by the tub and the post of the second bracket through a second hole defined by the tub, said step of fastening comprises fastening the first sleeve onto the post of the first bracket and the second sleeve onto the post of the second bracket.

16. A dishwasher appliance, comprising
a tub defining a wash chamber;
a wire frame positioned within the wash chamber;
a slide rail mounted to the tub;
means for coupling the wire frame to the slide rail;
a bracket mounted to the slide rail within the wash chamber of the tub;
a post integrally mounted to the bracket as a continuous element, the post extending through the tube; and
a sleeve positioned opposite the bracket on the tub, the sleeve engaging the post such that the sleeve hinders the post from retracting through the tub,
wherein the post comprises a threaded post and the sleeve defines an inner chamber that extends between a first opening and a second opening, the threaded post extending through the tub into the inner chamber of the sleeve at the first opening of the inner chamber, a fastener extending into the inner chamber of the sleeve at the second opening of the inner chamber outside of the wash chamber, the fastener being compressed against the sleeve.

17. The dishwasher appliance of claim 16, wherein the means for coupling comprises a projection and a clip, the projection mounted to the slide rail, the clip mounted to the wire frame and defining a first vertical slot, a second vertical slot and a transverse slot that extends between the first and second vertical slots, the projection moveable within the transverse slot between the first and second vertical slots.

18. The dishwasher appliance of claim 16, wherein the means for coupling comprises a plurality of hooks and a plurality of clips, the plurality of clips mounted to the slide rail, each clip of the plurality of clips defining an opening, the plurality of hooks mounted to the wire frame, each hook of the plurality of hooks positioned within a respective opening of the plurality of clips.

* * * * *

UNITED STATES PATENT AND TRADEMARK OFFICE
CERTIFICATE OF CORRECTION

PATENT NO. : 9,833,123 B2
APPLICATION NO. : 14/149877
DATED : December 5, 2017
INVENTOR(S) : Ryan Joseph Shaffer et al.

Page 1 of 1

It is certified that error appears in the above-identified patent and that said Letters Patent is hereby corrected as shown below:

In the Claims

In Line 34, Column 9, Claim 8 "providing the tub" should read "providing a tub";

In Line 37, Column 9, Claim 8 "post, and" should read "post and";

In Line 37, Column 9, Claim 8 "defining" should read "defines";

In Lines 42-43, Column 9, Claim 8 "a hole in a wall of the tub" should read "a hole defined by the tub";

In Line 58, Column 9, Claim 11 "to the slide rail" should read "to a slide rail";

In Line 4, Column 10, Claim 13 "farther" should read "further";

In Line 23, Column 10, Claim 16 "comprising" should read "comprising:";

In Line 31, Column 10, Claim 16 "tube" should read "tub".

Signed and Sealed this
Third Day of July, 2018

Andrei Iancu
*Director of the United States Patent and Trademark Office*